United States Patent
Thornton et al.

(10) Patent No.: US 11,586,875 B2
(45) Date of Patent: Feb. 21, 2023

(54) SYSTEMS AND METHODS FOR OPTIMIZATION OF A DATA MODEL NETWORK ARCHITECTURE FOR TARGET DEPLOYMENT

(71) Applicant: Massachusetts Institute of Technology, Cambridge, MA (US)

(72) Inventors: Jason R. Thornton, Chelmsford, MA (US); Luke Skelly, Groton, MA (US); Michael Chan, Bedford, MA (US); Ronald Duarte, Warwick, RI (US); Daniel Scarafoni, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 900 days.

(21) Appl. No.: 16/198,321

(22) Filed: Nov. 21, 2018

(65) Prior Publication Data
US 2019/0156178 A1 May 23, 2019

Related U.S. Application Data

(60) Provisional application No. 62/589,647, filed on Nov. 22, 2017.

(51) Int. Cl.
*G06N 3/04* (2006.01)
*G06N 3/08* (2006.01)
*G06N 3/084* (2023.01)

(52) U.S. Cl.
CPC .............. *G06N 3/04* (2013.01); *G06N 3/084* (2013.01)

(58) Field of Classification Search
None
See application file for complete search history.

(56) References Cited

U.S. PATENT DOCUMENTS

| | | |
|---|---|---|
| 9,111,147 B2 | 8/2015 | Thornton et al. |
| 9,189,687 B2 | 11/2015 | Thornton et al. |
| 9,251,424 B2 | 2/2016 | Thornton et al. |
| 9,373,033 B2 | 6/2016 | Chan et al. |
| 9,864,923 B2 | 1/2018 | Chan et al. |
| 2017/0169353 A1* | 6/2017 | Thompson ............. G06N 3/086 |

(Continued)

OTHER PUBLICATIONS

Fiszelew, A., et al. "Finding optimal neural network architecture using genetic algorithms." Advances in computer science and engineering research in computing science 27 (2007): 15-24. (Year: 2007).*

(Continued)

*Primary Examiner* — Hal Schnee
(74) *Attorney, Agent, or Firm* — McCarter & English, LLP

(57) ABSTRACT

Systems and methods are provided for selecting an optimized data model architecture subject to resource constraints. One or more resource constraints for target deployment are identified, and random model architectures are generated from a set of model architecture production rules subject to the one or more resource constraints. Each random model architecture is defined by randomly chosen values for one or more meta parameters and one or more layer parameters. One or more of the random model architectures are adaptively refined to improve performance relative to a metric, and the refined model architecture with the best performance relative to the metric is selected.

28 Claims, 8 Drawing Sheets

(56) References Cited

U.S. PATENT DOCUMENTS

| | | | |
|---|---|---|---|
| 2017/0301109 A1 | 10/2017 | Chan et al. | |
| 2018/0307981 A1* | 10/2018 | Cilingir | G06F 9/3001 |
| 2019/0057305 A1* | 2/2019 | Denolf | G06N 3/084 |
| 2019/0122119 A1* | 4/2019 | Husain | G06N 3/084 |

OTHER PUBLICATIONS

Doshi, Rohan, et al. "Deep learning neural networks optimization using hardware cost penalty." 2016 IEEE International Symposium on Circuits and Systems (ISCAS). IEEE, 2016. (Year: 2016).*

Lin, Yue-Jin, and Tian Sheuan Chang. "Data and hardware efficient design for convolutional neural network." IEEE Transactions on Circuits and Systems I: Regular Papers 65.5 (2017): 1642-1651. (Year: 2017).*

Zhang, Yundong, et al. "Hello edge: Keyword spotting on microcontrollers." arXiv preprint arXiv:1711.07128 (2017). (Year: 2017).*

Canziani, Alfredo, Adam Paszke, and Eugenio Culurciello. "An analysis of deep neural network models for practical applications." arXiv preprint arXiv:1605.07678 (2016). (Year: 2016).*

Suda, Naveen, et al. "Throughput-optimized OpenCL-based FPGA accelerator for large-scale convolutional neural networks." Proceedings of the 2016 ACM/SIGDA International Symposium on Field-Programmable Gate Arrays. 2016. (Year: 2016).*

Baker et al., Designing Neural Network Architectures Using Reinforcement Learning. https://arxiv.org/abs/1611.02167. ICLR, 18 pages, Mar. 22, 2017.

Bergstra et al., Hyperopt: a Python library for model selection and hyperparameter optimization. Computational Science & Discovery. Jul. 28, 2015;8:014008, 24 pages.

Bergstra et al., Random Search for Hyper-Parameter Optimization. Journal of Machine Learning Research. Feb. 2012;13:281-305.

Cortes et al., AdaNet: Adaptive Structural Learning of Artificial Neural Networks. Proceedings of the 34th International Conference on Machine Learning, PMLR 70, 10 pages, Feb. 28, 2017.

Desell, Large Scale Evolution of Convolutional Neural Networks Using Volunteer Computing. 2017 Genetic and Evolutionary Computation Conference. 17 pages, Mar. 17, 2017.

Doshi et al., Deep Learning Neural Networks Optimization using Hardware Cost Penalty. 2016 IEEE International Symposium on Circuits and Systems (ISCAS). pp. 1954-1957, May 22-25, 2016.

Gupta et al., Deep Learning with Limited Numerical Precision. Proceedings of the 32nd International Conference on Machine Learning. 10 pages, Feb. 9, 2015.

Han et al., Deep Compression: Compressing Deep Neural Networks with Pruning, Trained Quantization and Huffman Coding. ICLR 2016, 14 pages, Feb. 15, 2016.

Han et al., Learning both Weights and Connections for Efficient Neural Networks. NIPS 2015, 9 pages, Oct. 30, 2015.

He et al., Deep Residual Learning for Image Recognition. CVPR, 12 pages, Dec. 10, 2015.

He et al., Deving Deep into Rectifiers: Surpassing Human-Level Performance on ImageNet Classification. Computer Vision and Pattern Recognition. ICCV, 11 pages, Feb. 6, 2015.

Iandola et al., SqueezeNet: AlexNet-Level Accuracy with 50x Fewer Parameters and <0.5 MB Model Size. ICLR 2017, 13 pages, Nov. 4, 2016.

Kinnison et al., SHADHO: Massively Scalable Hardware-Aware Distributed Hyperparameter Optimization. https://arxiv.org/abs/1707.01428, 10 pages, Jan. 22, 2018.

Krizhevsky et al., ImageNet Classification with Deep Convolutional Neural Networks. NIPS, 9 pages, Dec. 2017.

Krizhevsky et al., Learning Multiple Layers of Features from Tiny Images. Technical Report, Univ, of Toronto. 60 pages, Apr. 8, 2009.

Liu et al., Learning Efficient Convolutional Networks through Network Slimming. ICCV, 10 pages, Aug. 22, 2017.

Nesterov, Efficiency of Coordinate Descent Methods on Huge-Scale Optimization Problems. Siam J. Optim. Apr. 2012;22(2):341-362.

Park et al., Faster CNNs with Direct Sparse Convolutions and Guided Pruning. ICLR 2017, 12 pages, Jul. 28, 2017.

Rastegari et al., XNOR-Net: ImageNet Classification Using Binary Convolutional Neural Networks. European Conference on Computer Vision. 17 pages, Aug. 2, 2016.

Real et al., Large-Scale Evolution of Image Classifiers. International Conference on Machine Learning. 10 pages, Jul. 17, 2017.

Simonyan et al., Very Deep Convolutional Networks for Large-Scale Image Recognition. ICLR 2015, 14 pages, Apr. 10, 2015.

Snoek et al., Practical Bayesian Optimization of Machine Learning Algorithms. Proceedings of the 25th International Conference on Neural Information Processing Systems. 9 pages, Dec. 3, 2012.

Srinivas et al., Learning Neural Network Architectures using Backpropagation. Proceedings of the British Machine Vision Conference (BMVC). 14 pages, Aug. 2, 2016.

Szegedy et al., Going Deeper with Convolutions. 2015 IEEE Conference on Computer Vision and Pattern Recognition (CVPR), 9 pages, Jun. 7-12, 2015.

Tao et al., Stochastic Coordinate Descent Methods for Regularized Smooth and Nonsmooth Losses. ECML PKDD, Part I, LNCS, Flach (Ed.), Springer-Verlag, Berlin. 2012;7523:537-552.

Yang et al., A Large-Scale Car Dataset for Fine-Grained Categorization and Verification. 2015 IEEE Conference on Computer Vision and Pattern Recognition (CVPR). 9 pages, Jun. 7-12, 2015.

Zoph et al., Neural Architecture Search with Reinforcement Learning. ICLR, 16 pages, Feb. 15, 2017.

* cited by examiner

SYSTEMS AND METHODS FOR OPTIMIZATION OF A DATA MODEL NETWORK ARCHITECTURE FOR TARGET DEPLOYMENT

RELATED APPLICATIONS

This application claims priority to U.S. Provisional Application No. 62/589,647, filed Sep. 22, 2017, the entire contents of that application being incorporated herein by reference.

STATEMENT OF GOVERNMENT SUPPORT

This invention was made with government support under FA8702-15-D-0001 awarded by the U.S. Air Force. The government has certain rights in the invention.

BACKGROUND

Data models described as "deep learning" models are increasingly popular as a means to detect and classify objects within complex data sets such as image data. An increasing number of data model variants are available that are optimized to solve different problems or to operate with certain types of data. Current development trends are focused on improving the accuracy of data models in detecting and classifying objects or patterns of interest.

SUMMARY

In exemplary embodiments taught herein, a method of selecting an optimized data model architecture executed by a computing device equipped with a processor and a memory operatively coupled to the processor is provided. The method includes receiving, via the computing device, one or more resource constraints for target deployment and generating, via the computing device, random model architectures from a set of model architecture production rules subject to the one or more resource constraints. Each random model architecture is defined by randomly chosen values for one or more meta parameters and one or more layer parameters. The method includes adaptively refining, via the computing device, one or more of the random model architectures to improve performance relative to a metric. The method also includes selecting, via the computing device, the refined model architecture with the best performance relative to the metric.

In another embodiment, a system for selecting an optimized data model architecture is provided. The system includes a computing device including a processor and a memory operatively coupled to the processor. The memory has instructions stored therein that when executed by the processor cause the computing device to receive one or more resource constraints for target deployment and generate random model architectures using a random model architecture generation module from a set of model architecture production rules subject to the one or more resource constraints. Each random model architecture is defined by randomly chosen values for one or more meta parameters and one or more layer parameters. The instructions cause the processor to adaptively refine one or more of the random model architectures using an adaptive refinement module to improve performance relative to a metric. The instructions also cause the processor to select the refined model architecture with the best performance relative to the metric.

BRIEF DESCRIPTION OF THE DRAWINGS

The accompanying drawings, which are incorporated in and constitute a part of this specification, illustrate one or more embodiments of the invention and, together with the description, help to explain the invention. The skilled artisan will understand that the drawings are primarily for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar or structurally similar elements).

The foregoing and other features and advantages provided by the present disclosure will be more fully understood from the following description of exemplary embodiments when read together with the accompanying drawings, in which.

DETAILED DESCRIPTION

Systems and methods taught herein provide optimization of data classification model architectures or analysis model architectures for applications that are subject to deployment resource constraints. Unlike conventional model optimization techniques that focus solely on improving accuracy, the present systems and methods can optimize data model architectures for use in real-world environments that are subject to resource constraints including limited computing, memory, or other resources. As a result, the optimized data models are selected based on both accuracy and other factors related to deployment such as model size or speed. The data models selected by embodiments of the present invention can be lightweight yet still highly functional according to the needs of the particular environment.

Data models such as convolutional neural networks (CNN) have evolved to address problems involving the analysis and classification of large amounts of data such as, but not limited to, challenges occurring in image recognition problems. Given labeled training data, data models have the ability to simultaneously learn a hierarchical feature representation of the underlying data and an optimal classifier. Some models published in the literature have even surpassed the image recognition performance of humans on an image classification task.

Conventionally, development of improved data models has been driven by the desire to achieve high accuracy, for example, on certain challenge problems. The designer generally has to manually choose from among a number of different network architectures having varying combinations of hyper-parameters such as learning rate, number of iterations, batch size for normalization, and regularization parameters. This model design process requires a large degree of human intervention. Furthermore, the resulting data models in some cases cannot be successfully deployed outside of a supercomputing center as no consideration was paid to the resource constraints for subsequent deployment of the models during the design stage. For example, the data model may require more memory than the particular computing environment has available or the data model may require that the computing environment can support a minimum number of floating point operations per second (FLOP/s) to meet run-time requirements. Systems and methods described herein optimize the data model to select a refined model architecture subject to resource constraints such that the optimized data model retains high accuracy while still operating within the intended target deployment environment.

Figure 1:
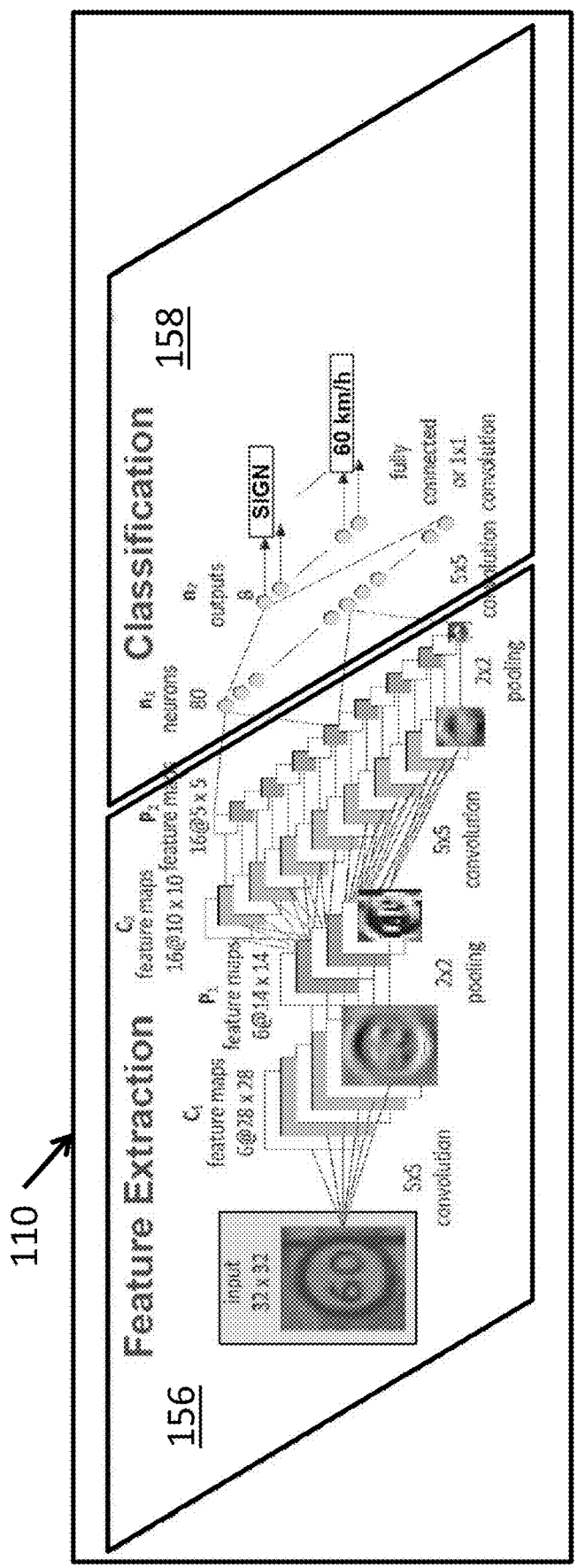
FIG. 1 illustrates a model architecture in accordance with various embodiments described herein.

FIG. 1 illustrates an exemplary model architecture 110 according to various embodiments described herein. Although the model architecture 110 in FIG. 1 is an image recognition and classification model, one of ordinary skill in the art will appreciate that systems and methods described herein are applicable to a wide variety of other types of problems using big data and is not limited to image analysis. The model architecture 110 includes one or more layers that operate on an input (for example, an image) and produce an output (sometimes referred to as a feature map or activation map). Subsequent layers in the model architecture 110 take feature maps from previous layers as input and output new feature maps to be operated on by subsequent layers. In various embodiments, layers of the model architecture 110 can include convolution, pooling, rectified linear units (ReLU), dropout, or network-in-network layers. The operations performed by the layers can include linear or non-linear operations in various embodiments.

In accordance with some embodiments, layers of the data architecture can include feature extraction layers 156 and classification layers 158. In some embodiments, the model architecture can include up to 5, up to 10, up to 30, or higher numbers of stacked layers of artificial "neurons." Each image is fed into the input layer, which then communicates to the next layer, until eventually the "output" layer is reached. The model architecture's "answer" or analysis is provided by this final output layer. In practice, each layer of the model architecture 110 progressively extracts higher-level features of the image until the final layer determines what the image shows. For example, the first or lowest layer may identify edges or corners. Intermediate layers may interpret basic features to look for overall shapes or components like a door or a leaf. The final few layers assemble those outputs into complete interpretations.

Layers in the model architecture can be partially-connected or fully-connected. When two layers are fully-connected, each neuron in the input activation map or layer is connected to every neuron in the output activation map or layer. Conversely, partial-connection between two layers indicates that each neuron in the input layer is only connected to a subset of neurons in the output layer.

The model architecture 110 is defined by one or more meta parameters 112 and one or more layer parameters 114. In an exemplary embodiment, the model architecture 110 can be a convolutional neural network (CNN). In various embodiments, meta parameters can include the total number of layers, the number of layers of a particular type (e.g., convolutional layers), or the ordering of layers. Meta parameters 112 are those parameters that govern the overall architecture of the model architecture 112 such as whether convolutional layers are always followed by pooling/max-pooling layers and how deep the model architecture 110 is. In some embodiments described in more detail below, the model architecture 110 can include sub-networks or network modules as building blocks. In such embodiments, the meta parameters 112 can also include module type for the sub-network and number of repetitions of the sub-network. Meta parameters 112 can also include relative preference values for sub-network types in some embodiments.

In various embodiments, layer parameters 114 include layer-specific parameters that determine how the layer acts upon the data inputs and the form of data outputs. For any given layer, the layer parameters 114 may include the size (in x- and y-directions) of the convolutional filter, the number of convolutional filters, the stride length, the padding value, the subsampling factor, neighborhood size of pooling layers, exclusion percentage of dropout layers, batch size of batch normalization layers, number of hidden nodes for fully-connected layers or any other suitable parameter that defines the operation or characteristics of a layer. The layer parameters 114 can be independently selected for each layer in the model architecture 110.

A particular model architecture 110 is uniquely defined by a set of values for given meta parameters 112 and layer parameters 114. In various embodiments, meta parameters 112 and layer parameters 114 are theoretically unbounded, and the parameter space defined by all values of all meta parameters 112 and layer parameters 114 is unfeasible to search manually to develop an optimal model architecture 110. It should be noted that the number of layer parameters 114 is dependent upon the model parameters 112 as certain choices for model parameters 112 can add or eliminate layers. Thus, the vast parameter space that is defined by the model parameters 112 and the layer parameters 114 is also variable in size. Conventional search methods are not equipped to handle such variable-size parameter spaces. Systems and methods described herein can strategically navigate the variable-sized parameter space defined by the meta parameters 112 and layer parameters 114 using random sampling and adaptive refinement techniques to select an optimized model architecture 110 for a particular platform given defined platform resource constraints.

Once particular meta parameter 112 and layer parameter 114 values are chosen to define a unique model architecture 110, the model architecture 110 can be trained to analyze and interpret data using backpropagation techniques and a set of annotated data. Backpropagation is a process by which the model architecture 110 adjusts the weights of filters in the layers to minimize the error occurring in evaluation of the training images. In accordance with various embodiments, the model architecture 110 can be trained and executed on a variety of suitable frameworks or platforms. In some embodiments, the model architecture can be implemented on a Caffe, TensorFlow, Torch, or Theano framework. The framework can operate the model architecture 110 in a backward direction in a training phase and in a forward direction in an implementation or execution phase.

Optimization of the structure of the model architecture 110 (i.e., selection of meta parameters 112 and layer parameters 114) is of paramount concern for target deployment platforms that will be used to execute the model and that have limited resources to train and run the model architecture 110. Previous approaches to optimization have suffered from a number of drawbacks including being limited to fixed-size parameter spaces, incurring a large computational cost requiring many hundreds of GPU's to produce the model and/or suffering from extended execution times.

Some previous works have addressed the question of resource constraints separately from the architecture learning problem. For example, data model development has focused on limiting numerical precision, network pruning or slimming, using specialized network components, or implementing sparse convolutions. However, all of these methods either assume that a network architecture has already been determined or required significant human input to design the network architecture from scratch.

Systems and methods described herein address the constrained architecture learning problem with variable-dimension parameter spaces. In some embodiments, a sequential combination of broad randomized searches and stochastic coordinate descent optimization is used that finds good solutions from a very large architecture space. This is in contrast to, for example, evolutionary approaches, which perform a large number of random adaptations and may not be the most efficient, and reinforcement learning approaches, which perform targeted search based on policy gradients that typically need to be estimated from many more coordinate dimensions to be effective. Systems and methods described herein take into account deployment resource constraints upfront by incorporating these restraints into the optimization framework in an integrated fashion.

Figure 2:
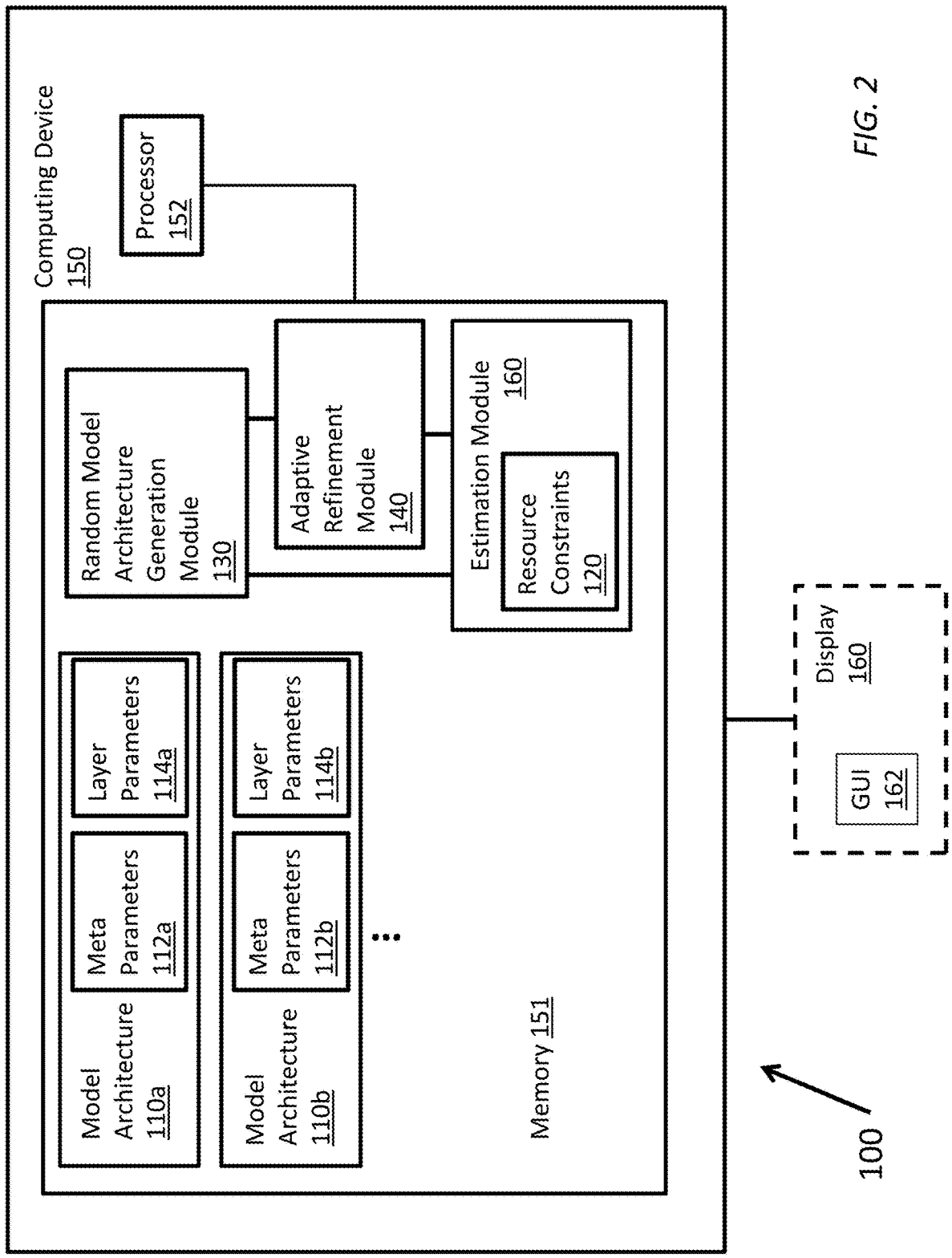
FIG. 2 illustrates a system for optimization of a model architecture for target deployment in accordance with various embodiments described herein.

FIG. 2 illustrates a system 100 for selecting an optimized data model architecture in accordance with various embodiments described herein. The system 100 includes a computing device 150 having a processor 152 and a memory 151. The memory 151 holds executable instructions for an estimation module 160 that takes into account one or more resource constraints 120, a random model architecture generation module 130, and an adaptive refinement module 140. The memory 151 can also store one or more model architectures 110a, 110b. Each model architecture 110a, 110b includes values for meta parameters 112a, 112b and values for layer parameters 114a, 114b. As described in detail below, the random model architecture generation module 130 generates random model architectures 110a, 110b through random selection of meta parameters 112 and layer parameters 114. The adaptive refinement module 140 adaptively refines one or more of the model architectures 110a, 110b to improve performance of the model architecture. The performance of a model architecture 110a, 110b relative to a metric (e.g., accuracy or efficiency) and validation that the model architecture 110a, 110b satisfies resource constraints 120 may both be assessed by the estimation module 160. In some embodiments, the estimation module 160 can use an objective function to evaluate the performance of the model architecture 110a, 110b. The estimation module 160 can assess model architectures 110a, 110b produced by the random model architecture generation module 130, the adaptive refinement module 140, or both in various embodiments. Through progressive refinement of one or more model architectures 110, the system 100 can select the refined model architecture 110 with the best performance relative to the metric that still satisfies resource constraints 120 of the particular target platform. In many embodiments, the selected model architecture 110 represents a satisfactory compromise between accuracy and suitability for the particular target platform, e.g., the selected model architecture 110 may give up some performance characteristics (e.g. be slightly less accurate) but can be developed and trained on consumer-grade systems rather than requiring a supercomputer.

In some embodiments, the computing device 150 may be connected to a display 160 that includes a graphical user interface (GUI) 162. Suitable computing devices 150 for use with systems 100 and methods of the present application are described in greater detail below with reference to FIG. 6.

In some embodiments, the overall problem of model architecture selection can be formulated as an optimization task defined as an objective function that is sought to be optimized. An exemplary objective function evaluated by the estimation module 160 and the related model architecture 110 representation is described below. However, the systems and methods described herein are not limited to this specific objective function or model architecture representation.

As an exemplary approach, let A denote the set of model architecture parameters (i.e., the architecture specification through meta parameters 112 and layer parameters 114), and let $w_k$ denote the collection of weights assigned to the model architecture 110 after k iterations of backpropagation using a training dataset. In some embodiments, the optimization task is to select a model architecture A that, when A is realized with a set of trained weights, minimizes the objective function in the following form:

$$\hat{A} = \arg\min_{A, w_k} J(A, w_k) \text{ s.t. } \bigwedge_j (C_j(A) < \tau_j). \quad (1)$$

The objective function is essentially a weighted sum of a loss term L given the labeled data $\{x_i, y_i\}$ and a regularization term R as shown below:

$$J(A, w_k) = L(A, w_k | \{x_i, y_i\}) + \beta \cdot R(A). \quad (2)$$

In Equation (1), $C_j$ represents the cost of the jth resource of a particular model architecture 110, which together with thresholds $\tau_j$ represent the hard resource constraint 120. The loss term measures the cross-entropy error of the model with respect to a labeled data set while the regularization term measures the complexity of the architecture in some way; for example, those that favor smaller number weights in the model. The constraint in Equation (1) essentially defines a restricted solution space, for example to meet certain requirements on memory usage and computational budget, i.e., resource constraints 120. To directly measure classification accuracy on validation data, L can be formulated as such, which can be used as stop criteria for backpropagation training and model selection in some embodiments.

The objective function and the training process itself are defined by several parameters that are within the user's control. These hyper-parameters can include learning rate, number of iterations, batch size for normalization, and regularization parameters. In some embodiments, systems and methods described herein can adjust hyper-parameters during a cycle of model architecture optimization, between cycles of model architecture optimization, or at the end of the model architecture learning optimization to produce or train the final model architecture 110.

Generation of a network model architecture can follow a set of production rules using a network generation framework that is founded on context-free grammars in some embodiments. The model architecture 110 can be randomly produced from the set of production rules by the random model architecture generation module 130. In one embodiment, the model architecture 110 can be randomly produced from the starting non-terminal symbol S using the following set of production rules:

1. S→(L·Λ|T·L·Λ)
2. Λ→(L·Λ|F)

3. F→(fc·F|end)
4. T→(T₁| ... |T_N)
5. L→(L_{comp}|L_{prim}|L_{custom})
6. L_{comp}→(Dnet_{mod}|Incep_{mod}|Rnet_{mod})
7. L_{prim}→(cv|fc|mp|bn|rl)

where L is a generic layer, Λ is recursively defined to allow the total number of layers in the network to be arbitrarily large if desired, and F is included for producing networks that end in fully connected layers. In some embodiments, each option in the above production rules can be equally likely (i.e., equally weighted) in the random selection process or the options can be differently weighted. For example, rule (2) can have a weighting of 75% toward option L·Λ and 25% toward option F at a particular stage. The weightings among options at different points during the random model architecture generation process can be constant or can change at one or more points in the process.

In some embodiments, L can be a primitive layer L_{prim} (i.e., convolution, fully-connected, maxpooling, batch normalization, or ReLU), a composite layer L_{comp}, which can be any predefined sets of sequential and/or parallel primitive layers, or a custom layer as discussed below. Examples of a composite layer include modules from networks such as Darknet, Inception, Resnet or other custom networks. Other examples include long short-term memory (LSTM) or gated recurrent unit (GRU) cells for forming recurrent model architectures 110. T is included to facilitate transfer learning, which can be selected from up to N predefined networks as described in greater detail below. Note that the use of the regular expression notation in a general rule such as C→(A|B) is equivalent to two separate rules C→A and C→B.

In some embodiments, generation of the model architecture can include generation of all or a portion of the model architecture according to a specific style or profile in the form of a custom layer. Then, the random model architecture generation module 130 can impose prior probabilities over the production rules for each unique non-terminal symbol to influence selection of the custom layer during model architecture generation. For example, to enforce the production of VGG-style models, define $$L_{custom} \rightarrow cv \cdot rl \cdot bn \cdot mp$$

where cv represents a convolutional layer, rl represents a ReLU layer, bn represents a batch normalization layer, and mp represents a max-pooling layer. Then, rather than assigning uniform probabilities to all possibilities in the L rule described above (i.e., rule 5), the generation process can set the prior probability function for the L rule to equal one for selecting L_{custom} vs. zeros for selecting others. In some instances, recursively defined rules can descend into infinite recursion. Thus, in some embodiments, the random model architecture generation module 130 can utilize a cap on the maximum depth of recursion or, alternatively or in addition, can progressively decrease the probability of recursion as a function of depth level to avoid infinite recursion. In some embodiments, meta parameters or layer parameters defining custom layers or custom groups of layers can be stored in the memory 151 of the computing device 150. In some embodiments, custom layers or groups of layers can include pre-trained model architectures including pre-trained weights for some or all of the layers (e.g., transfer network layers T_i or custom layers L_{custom}) The pre-trained model architectures including pre-trained weights can be stored in the memory 151.

By generating model architectures that include custom recursive layers, the custom layers can be optimized for end-to-end performance of the whole model architecture 110. The architecture learning optimization infrastructure described herein can be also be applied to a custom layer itself which enables discovery of unknown, novel custom layer forms as well as improved variants of network modules developed by others when implemented as custom layers. In some embodiments, the random model architecture generation module 130 can provide model architectures with skips and branches, e.g., via the use of specific custom layers that already utilize skips and branches.

In some embodiments, the generation of model architectures can include generation of completely arbitrary network architectures (e.g., graph grammars) from primitive layers.

In some embodiments, a more limited model architecture 110 representation is appropriate. For example, many model architectures 110 always follow a convolutional layer with a max-pooling layer. In addition, model architectures 110 that do not include skips and branches can greatly simplify the model architecture representation. One such streamlined implementation wherein convolutional layers are bundled with maxpooling and other sampling layers is described next.

While a variety of training frameworks can be used as described above, the present representation is framework-agnostic for generality. With such an approach, each CNN architecture A with C convolutional layers and F fully-connected layers can be represented by an n-tuple descriptor: (size_{input}, params_{conv}, params_{fc}, size_{output}), where $$\text{params}_{fc} = (N_{fc}^1, \ldots, N_{fc}^F), \quad (3)$$

$$\text{params}_{conv} = (\text{var}_{cv}^1, \ldots, \text{var}_{cv}^C), \quad (4)$$

$$\text{var}_{cv}^i = (N_{filt}^i, \text{filt}_x^i, \text{filt}_y^i, \text{pool}_x^i, \text{pool}_y^i, \text{sub}_x^i, \text{sub}_y^i) \quad (5)$$

Here, $N_{fc}^i$ and $N_{filt}^i$ represent the number of fully-connected (or hidden) layers and filters, whereas $\text{filt}^i$, $\text{pool}^i$, and $\text{sub}^i$ represent the sizes (in the x and y directions) of the convolutional filter or filters, pooling neighborhood and subsampling factor in a particular layer i, respectively. The output of each convolution layer is passed through a standard ReLU activation function and followed by a batch normalization step.

This template provides a relatively simple way to formulate model architectures and includes several implicit assumptions. For example, it is implicitly assumed in the above model that a convolutional layer is always followed by a max-pooling layer. While this assumption is commonly satisfied by exemplary model architectures, many good network architectures have been constructed in a more modular way, for example, by allowing smaller neural network components to repeat in their construction. Examples include VGG, Inception, Resnet, SqueezNet and Darknet, to name a few. In accordance with systems and methods described herein and as described above in the formulation of the general production rules, it is possible to apply the optimization and search techniques herein to broader classes of more complex architecture types as well, including, for example, architecture types that incorporate skips and/or branches. Thus, generation of model architectures in accordance with embodiments described herein can incorporate network components or layering patterns that have previously demonstrated to be useful as building blocks. By using pre-determined sub-components and patterns as building blocks, systems and methods of the present application can reduce the overall search space and also minimize the effort needed to learn from scratch network connections or pattern thereof that were previously known to be useful.

Some embodiments of systems and methods described herein can take advantage of transfer learning. Transfer learning can advantageously enable use of model architectures that are partially trained using a large set of data different than the target data. After initial training, one or more of the final layers of the model architecture (e.g., the classification layers 158 as described with respect to FIG. 1) are re-trained using annotated data of the target data type. Transfer learning can provide robust models in application domains where limited annotated data exist. In some situations, optimization of performance using transfer learning can depend upon the similarity of the original application domain (used to partially train the model) to the target application domain. Systems and methods described herein can generate models reflective of transfer learning and can optimize the determination as to how many layers of weights to relearn or whether to modify the architecture of those layers at all.

Figure 3:
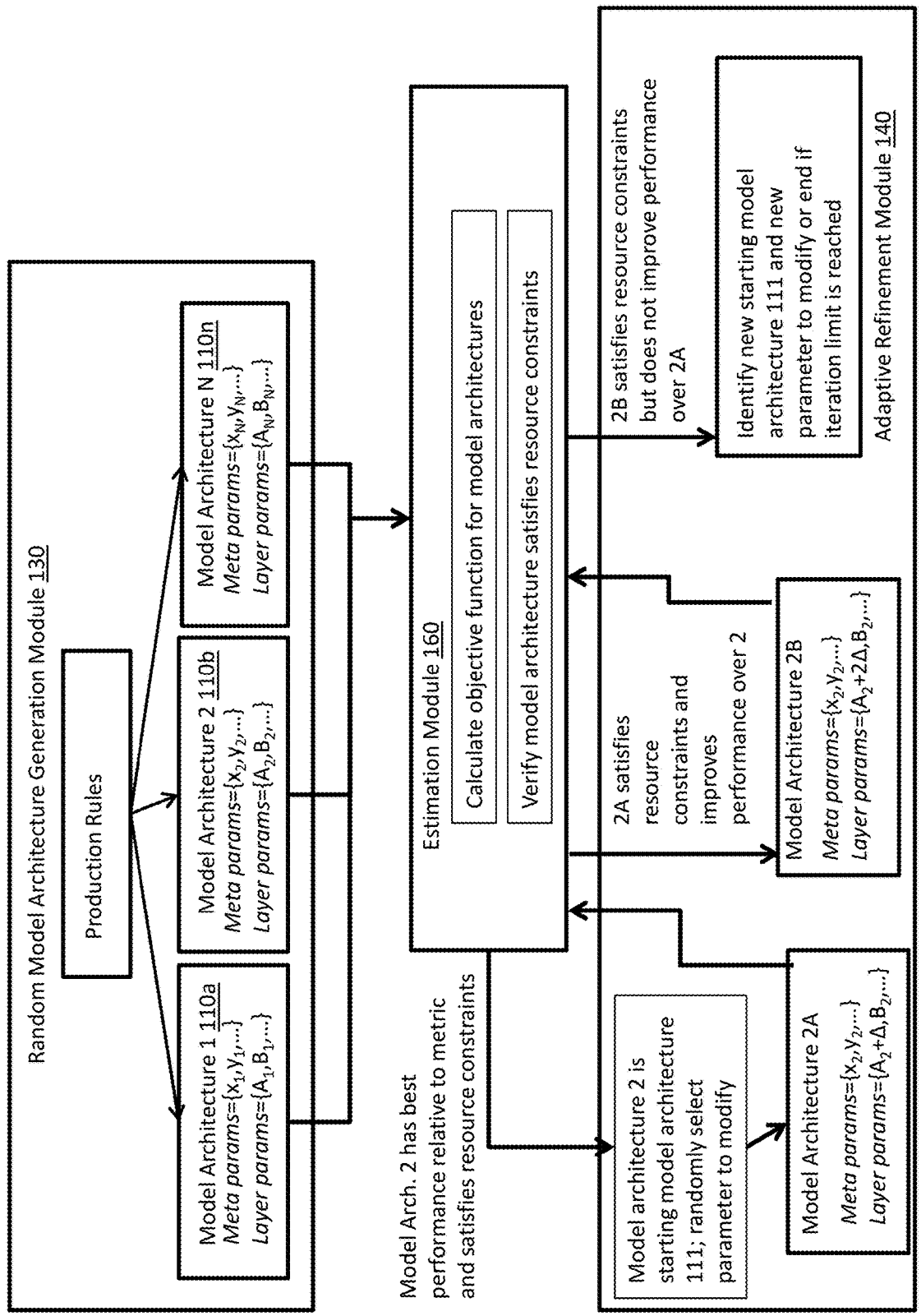
FIG. 3 is an exemplary workflow for generation and adaptive refinement of model architectures in accordance with systems and methods described herein.

FIG. 3 illustrates an exemplary workflow for generation and adaptive refinement of model architectures 110 in accordance with systems and methods described herein. Systems and methods described herein employ a stochastic optimization method that can include two main components: (1) random architecture sampling, and (2) adaptive architecture sampling. In other words, random model architectures that are generated according to the set of production rules described above (i.e., random architecture sampling) can subsequently be adaptively optimized (i.e., adaptive architecture sampling). In some embodiments, the output from the random model architecture generation module 130 can be used an input to the adaptive refinement module 140 of the system 100.

The random model architecture generation module 130 can select all model architecture parameters from uniform distributions over the possible values defined by an initial model space including meta parameters 112 and layer parameters 114. In an exemplary variant, a chained sampling process is used. In the chained sampling process, one or more meta parameters 112 that determine layer selection and ordering are generated. Then, one or more layer parameters 114 are generated for each layer that are specific to that layer. In some embodiments, random selection of meta parameters 112 or layer parameters 114 can be performed according to a probability function that is uniform or non-uniform. For example, the probability function can be a uniform distribution or an alternative function specific to the style of model architecture 110 that is desired to be generated. Algorithm I illustrates an exemplary process executed by the random model architecture generation module 130 by selection of meta parameters 112 and layer parameters 114. In some embodiments, the random model architecture generation module 130 can generate NRANDOM random model architectures 110*a*, 110*b*, . . . 110*n*.

---
Algorithm I: Random Architecture Sampling
---
k ← 0
modelPool ← { }
WHILE k < NRANDOM
  LOOP:
    $A_k$ = GetRandomArch(MODEL_SPACE)
    IF FailValidArch($A_k$)
      CONTINUE LOOP ---
-continued Algorithm I: Random Architecture Sampling
---
    IF FailConstraint($A_k$, THRESH)
      CONTINUE LOOP
    ELSE
      BREAK LOOP
  modelPool ← Append(modelPool, $A_k$)
  k ← k + 1

In some embodiments and as referred to above, the production rules can include pre-defined layers or groups of layers (e.g., transfer network layers $T_i$ or custom layers Lcustom). The pre-defined layers can include, in some cases, partial model architectures with pre-trained weights. In some embodiments, the random model architecture generation module 130 can incorporate partial model architectures with predefined weights into the random model architecture 110. It may be desirable to maintain the partial model architecture largely intact while only varying parameters for other parts of the overall random model architecture 110. For example, a subset of the random model architecture 110 (e.g., layers of the partial model architecture) can have fixed meta parameters 112, fixed layer parameters 114, or both fixed meta parameters 112 and fixed layer parameters 114 during generation of model architectures. In some embodiments, the subset of the random model architecture 110 can be initialized with random weights and fixed while other layers in the model architecture 110 are randomly generated and adaptively refined. In other embodiments, the subset of the random model architecture 110 can be initialized with pre-trained weights and fixed while other layers in the model architecture 110 are randomly generated and adaptively refined. Here, fixing the subset of the random model architecture 110 means preventing the adaptive refinement module 140 from adjusting the meta parameters 112 or layer parameters 114 related to those layers in the fixed subset of the random model architecture 110.

Each random model architecture 110*a*-110*n* is generated subject to resource constraints 120. In other words, a model architecture 110*a*-110*n* that is produced according to the methods and systems described herein, when realized with a set of trained weights, must be capable of operating within the given resource constraints 120. The estimation module 160 can receive a random model architecture 110*a*-110*n* from the random model architecture generation module 130 for analysis of whether the model architecture 110*a*-110*n* satisfies the resource constraints 120. For example, resource constraints can include upper limits on parameter count, number of trained weights, available memory (during training or at runtime) or number of FLOP/s. In some embodiments, a random model architecture 110*a*-110*n* that, when trained, operates out of bounds in relation to resource constraints 120 (e.g., requires too much memory) is discarded. In accordance with various embodiments, any generated random model network architectures 110*a*-110*n* that fail to satisfy the one or more resource constraints 120 can be discarded before passing execution to the adaptive refinement module 140. In some embodiments, the random model architecture generation module 130 can then generate a new random model architecture 110*a*-110*n* to replace the discarded model architecture.

In some embodiments, the random model architecture generation module 130 can continue to generate and assess random model architectures 110*a*-110*n* in an iterative fashion until one or more model architectures 110*a*-110*n* are identified that satisfy the resource constraints 120. The iteration can proceed until a pre-determined number of model architectures 120 is identified. For example, in some embodiments, the output of Algorithm I is a total of NRANDOM random model architectures 110a-110n that satisfy the resource constraints 120.

The random model architectures 110a-110n are passed from the random model architecture generation module 130 as input for the adaptive refinement module 140 to adaptively refine the model architectures 110a-110n to improve performance relative to a metric. In adaptive refinement, information about random model architectures 110a-110n and their objective function values (as determined by the estimation module 160) is used to determine how to modify the values of meta parameters 112 and layer parameters 114 in order to improve performance. In other words, adaptive refinement is an iterative process where at least one meta parameter or layer parameter of a random model architecture 110a-110n is modified and a new objective function value is determined using the estimation module 160. In some embodiments, a coordinate descent formulation is employed that is designed to work in variable-dimension parameter spaces. Unlike sampling methods that work with fixed-parameter spaces, the coordinate descent formulation can handle particular variable-dimension parameter spaces wherein the existence of some layer-specific parameters depends on the values of certain meta-parameters. For example, modification of the meta parameters 112 to include more layers also adds additional layer parameters 114 associated with those layers and thus changes the size of the parameter space.

In some embodiments, the adaptive refinement module 140 can perform adaptive refinement of the random model architectures 110a-110n using the sequence illustrated below as Algorithm II. The process described in pseudocode in Algorithm II provides an exemplary sequence and should not be construed as limiting adaptive refinement as described herein to only the described steps or their ordering. In the initial step, the adaptive refinement module 140 identifies a starting model architecture 111 from among the random model architectures 110a-110n. For example, the starting model architecture 111 can be the model architecture with the best performance relative to a metric such as accuracy or efficiency. In other words, the starting model architecture 111 can have the best performance against the objective function from among the random model architectures 110a-110n as determined by the estimation module 160. In various embodiments, the "best" performance can be defined as producing either the highest value or the lowest value of the objective function. In subsequent stages, the starting model architecture 111 may be selected from among all model architectures 110 including randomly generated model architectures and adaptively refined model architectures. For example, in a multi-threaded process, other workers (e.g., processors) may simultaneously be improving model architectures and may have identified a new best-performing model architecture.

The adaptive refinement module 140 randomly decides whether to modify one or more of the meta-parameters 112 (e.g., by adding or removing layers from the model architecture) or to modify one or more layer parameters 114 within one or more randomly selected layers of the selected model architecture 111. In the case where the adaptive refinement module 140 modifies one or more layer parameters 114, an increasing or decreasing coordinate direction is chosen for modifying the parameter value. The direction can be chosen randomly in some embodiments. In some embodiments, random selection of parameters to vary or step size by which to vary the parameter for each iteration of the adaptive refinement module 140 can be performed according to a probability function that is uniform or non-uniform. For example, the probability function can be a uniform distribution or an alternative function specific to the style of model architecture 110 that is desired to be generated.

The estimation module 160 tests the resulting modified model architecture 110 against the objective function subject to satisfaction of resource constraints as described above. If the resulting modification leads to a performance improvement and does not violate resource constraints, the adaptive refinement module 140 continues to sample in the same coordinate direction testing each new model architecture 110 until improvement stops; this process is analogous to performing coordinate descent optimization. In fact, it is a form of stochastic coordinate descent method where only one coordinate dimension is randomly chosen and updated at a time. Values selected for meta parameters 112 or layer parameters 114 during adaptive refinement can be outside of the initial model space at this stage in some embodiments.

---

Algorithm II: Adaptive Architecture Learning

```
k ← 0
WHILE k < NADAPT
    (A_opt, score_opt) ← BestModel(modelPool)
    type ← SelRandom({meta, layer})
    IF type == meta
        LOOP_M:
            L_i ← SelRandomLayer(A_opt)
            action = SelRandom({add, remove})
            IF action == remove
                A_k ← RemoveLayer(A_opt, L_i)
            IF action == add
                A_k ← AddLayer(A_opt, Randomize(L_i))
            IF FailConstraint(A_k, THRESH)
                CONTINUE LOOP_M
            score_k ← EvalObjective(A_k)
            modelPool ← Append(modelPool, A_k)
            k ← k + 1
    IF type == layer
        LOOP_L:
            L_i ← SelRandomLayer(A_opt)
            α ← SelRandom({inc, dec})
            IF LayerType(L_i) == conv
                key ← SelRandomParam({n_filt, ...
                    filt_sz, pool_sz, sub_sz} )
            IF LayerType(L_i) == fc
                key ← n_hidden
            LOOP_DESCENT:
                Val(L_i, key) ← α * Val(L_i, key)
                A_k ← UpdateArch(A_opt, L_i)
                IF FailConstraint(A_k, THRESH)
                    BREAK LOOP_DESCENT
                score_k ← EvalObjective(A_k)
                modelPool ← Append(modelPool, A_k)
                IF score_k > score_opt
                    score_opt ← score_k
                    k ← k + 1
                    CONTINUE LOOP_DESCENT
                ELSE
                    k ← k + 1
                    BREAK LOOP_DESCENT
```

---

Once improvement has stopped along a particular coordinate dimension, the adaptive refinement module 140 can select new meta parameters 112 or layer parameters 114 to vary for further iteration. The selection of whether to vary meta parameters 112 or layer parameters 114 can be made randomly. In some embodiments, the process of alternating between randomly modifying the dimensions of the parameter space to look for improvement (i.e., modifying meta parameters 112) and conducting coordinate descent within a fixed-dimension parameter space (i.e., modifying layer parameters 114) can be repeated multiple times. The routine in Algorithm II finishes after evaluating a total of NADAPT adaptive samples.

To determine the performance of a model architecture 110 with respect to a metric using the estimation module 160, the weights of the model architecture 110 have to be trained on an annotated set of data using backpropagation. In accordance with various embodiments described herein, the estimation module 160 can cut off backpropagation before convergence when analyzing the performance of a candidate model architecture 110. Typically, error backpropagation techniques employ multiple passes (or iterations) through the training data until the performance of the model architecture 110 against the metric (e.g., accuracy) measured on the training data or validation data levels off (i.e. until it converges). However, the performance relative to the metric measured at early iterations in the process can be considered an indicator of model "traction," or likelihood to converge to high performance. By judging model architecture 110 performance relative to a metric early during training, significant savings of the computational load required to explore the model architecture parameter space are realized. Systems and methods of model architecture optimization described herein produce good results using assessments of model architecture performance at only partial convergence of backpropagation training. In some embodiments, this early cut-off of backpropagation can be used during assessment of random model architectures 110 produced by the random model architecture generation module 130 or during assessment of adaptively refined model architectures 110 produced by the adaptive refinement module 140.

After adaptive refinement of one or more random model architectures 110 subject to resource constraints 120, the best-performing refined model architecture 110 relative to the metric can be selected. In various embodiments, the metric can be classification accuracy, operational efficiency (e.g., lower power or fewer computational cycles), or other appropriate objective measures of the model architecture's performance. In some embodiments, the selected model architecture 110 provides optimized performance (e.g., accuracy or efficiency) for a given resource-constrained target platform upon which the model architecture will run. In many cases, the selected model architecture will represent a trade-off wherein the model architecture provides the highest possible performance given the constraints on resources of the target platform.

The steps of generating random model architectures and adaptive refinement of the model architectures may be considered to be somewhat analogous to breadth-first and depth-first searches. In some embodiments, systems and methods described herein can change the optimization process to be more depth-first or breadth-first by altering the ratio of random and initial adaptive architecture iterations (e.g., the ratio of NRANDOM to NADAPT in Algorithms I and II). Alternatively, systems and methods described herein can utilize an N-best methodology. The N-best methodology uses the top N architectures for generating subsequent architectures as opposed to using only the current top architecture. This serves as somewhat of a hybrid compromise between depth-first and breadth-first in that multiple "threads" of depth-first search can be pursued at the same time, which reduces the possibility of selecting a model architecture that leads to a shallow local optimum.

The adaptive refinement module 140 can operate to refine more than one random model architecture 110 at the same time or refine in sequence. In systems that include multiple or parallel processors, adaptive refinement of multiple random model architectures 110 can proceed synchronously or asynchronously according to various embodiments described herein. In a synchronous optimization process, model architectures are adaptively varied, trained, and evaluated one at a time in sequence. When multiple workers (e.g., processors, threads, or computing systems) are employed in a synchronous variant, each worker operates independently and does not exchange information with other workers. In an asynchronous optimization process, any worker (e.g., processors, threads, or computing systems) that finishes adaptive refinement of a model architecture 110 is immediately given a new model architecture 110 to refine. The choice of asynchronous or synchronous operation may provide no difference algorithmically during operation of the random model architecture generation module 130 in some embodiments. Conversely, sequential operation of the adaptive refinement module 140 may be more optimal (given a fixed number of architecture evaluations) than asynchronous operation of the adaptive refinement module 140 because waiting for each model architecture 110 in a given round to finish optimization allows the best-performing model architecture 110 for the next round to be chosen from a larger pool.

A further implementation variant of the adaptive refinement process includes fusing the N top model architectures 110 during or after the adaptive refinement process to produce an ensemble model. For example, the system 100 can select the N refined model architectures 110 with the best performance relative to the metric. For example, the best two, three, four, five, or more model architectures 110 can be chosen in order of descending performance relative to the metric. The model architectures 110 can be subject to the resource constraints 120 or, in some embodiments, can be developed without resource constraints 120. The model architectures 110 can then be deployed in unison during a data classification scheme using a majority voting scheme. In other words, each model architecture 110 can make an independent classification assessment of data and the final result will be determined by the classification assessment that the majority of model architectures 110 produced. Use of a fused ensemble selected model architecture 110 can provide improved classification results in some embodiments and can help avoid pitfalls associated with specific "blind spots" that a particular model architecture 110 may exhibit.

Figure 4:
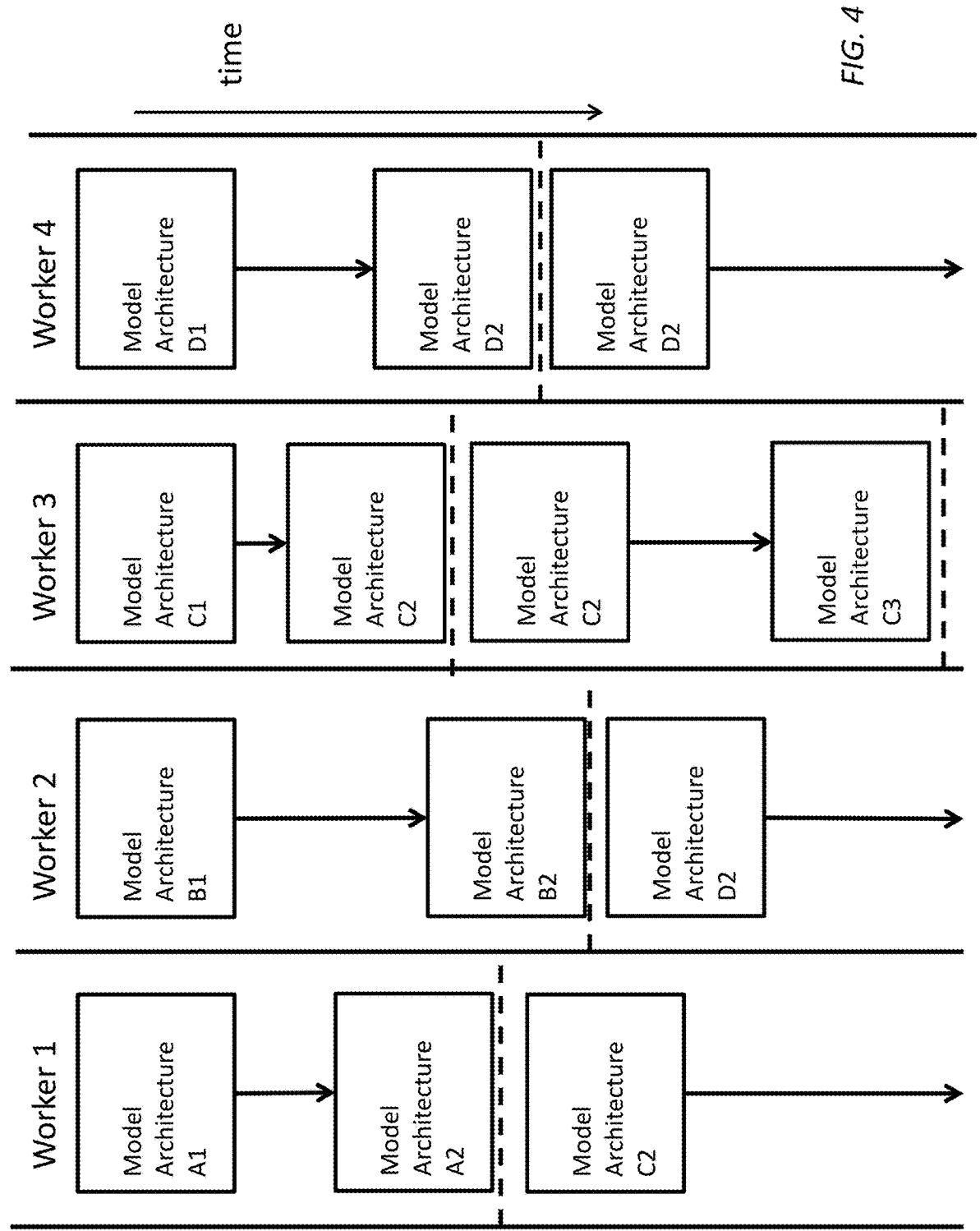
FIG. 4 illustrates an exemplary asynchronous implementation of the methods described herein across multiple parallel threads.

FIG. 4 illustrates an exemplary asynchronous variant of the adaptive refinement process in accordance with various embodiments described herein. Four workers (e.g., threads in a single processor, processors, or computing systems) are working simultaneously on adaptive refinement over time (the time axis passes from top to bottom). In this example, the workers begin with different starting model architectures 111. It should be appreciated, however, that in another embodiment the workers could be provided the same starting model architecture 111 and made to select different parameters to vary. Here, Worker 3 completes an iteration first. At this point, there are no other results from other workers available so Worker 3 continues to refine Model Architecture C2. Worker 1 is next to complete an iteration cycle. In this example, C2 is found to perform better than A2. Thus, Worker 1 switches to refinement of C2 for the next computational cycle. Worker 4 is next to finish a cycle. In this example, Model Architecture outperforms A2 and D2. Thus, Worker 4 continues to refine D2 in the next computational cycle. Worker 2 finishes the cycle next and adopts Model Architecture D2 as it is the best performing model architecture at that point in time. The asynchronous variant illustrated in FIG. 4 provides the advantage that workers immediately jump to the most promising model architecture known to all workers. However, workers will occasionally waste computational time optimizing a model that is suboptimal and that will be put to the side in the next computational cycle in favor of a different model architecture.

Figure 5:
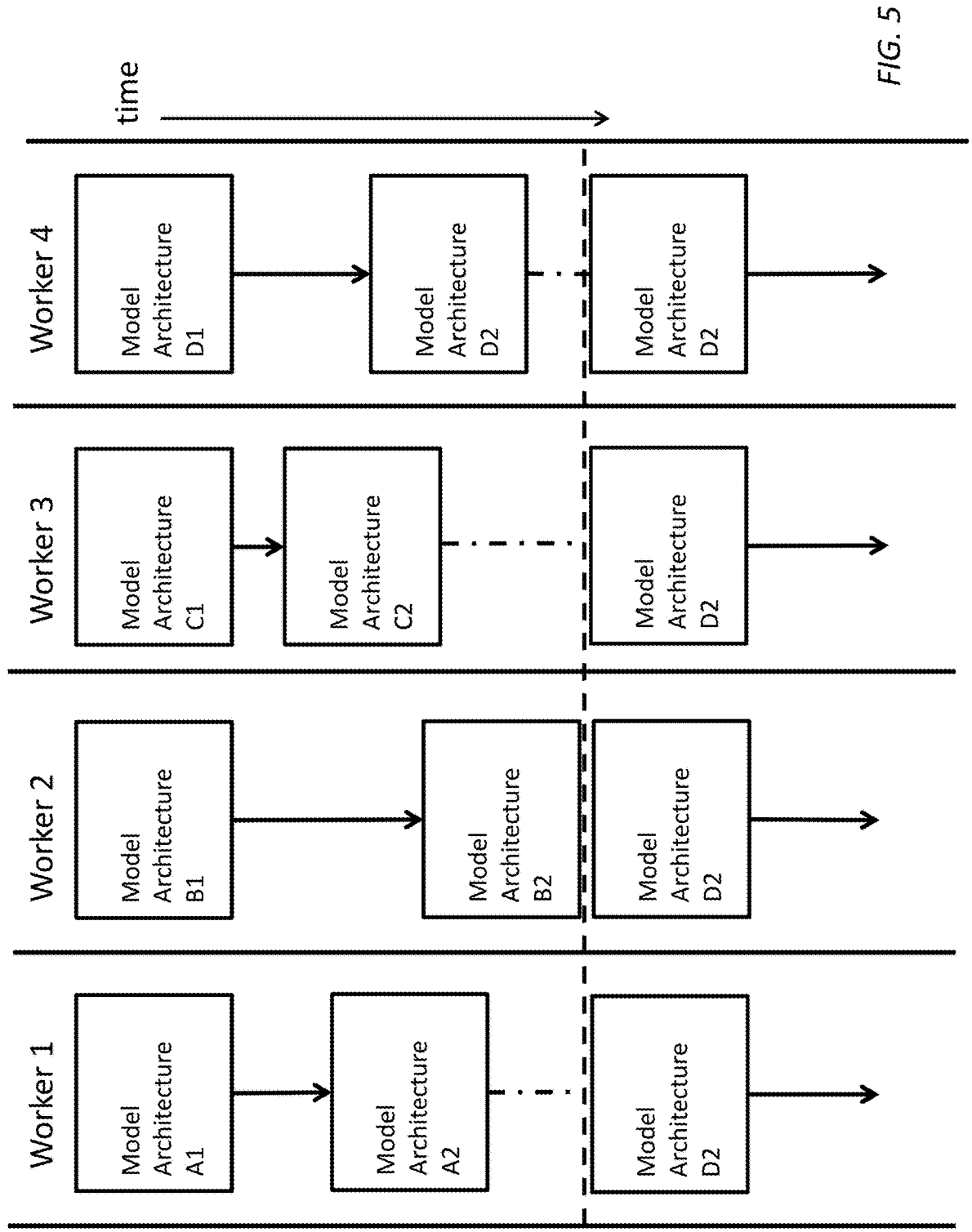
FIG. 5 illustrates an exemplary asynchronous N-best implementation of the methods described herein across multiple parallel threads.

FIG. 5 illustrates an exemplary asynchronous N-best variant of the adaptive refinement process in accordance with various embodiments described herein. As opposed to the baseline configuration illustrated in FIG. 4, each of the four workers waits until all workers are completed before beginning a new computational cycle. Thus, workers 1, 3, and 4 wait until worker 2, which is the slowest to complete its cycle in this example, completes refinement of Model Architecture B1. After all workers have completed this cycle, performance of the refined models with respect to the metric is determined and compared. In this example, Model Architecture D2 is the best-performing of the four model architectures and is adopted by all workers into the next computational cycle. The asynchronous N-best variant provides the advantage that all workers are working on the best-performing model architecture during all computational cycles. However, certain workers in the N-best system will have idle time while waiting for other workers to complete the computational cycle (as indicated in FIG. 5 by the dot-dash lines).

To assess whether a model architecture 110 violates resource constraints, the estimation module 160 evaluates the model architecture 110 to provide a basis for comparison to the resource constraint 120. In exemplary embodiments, intrinsic properties of the model architecture (e.g., number of weights, filter size, etc.) can be used to estimate the size and computational efficiency of the model architecture. In many models, the number of weights used in the model architecture is the main contributor to both memory and number of floating point operations per second (FLOP/s) utilized by the model architecture 110. In various embodiments, the estimation module 160 can estimate a memory requirement, estimate a FLOP/s requirement, or estimate both a memory requirement and a FLOP/s requirement. Embodiments that estimate both the memory requirement and the FLOP/s requirement for the model architecture can more closely mirror actual runtime requirements of the model architecture than estimation of one requirement alone. In some embodiments, the resource constraints 120 can be tied to a particular target deployment platform of given computational architecture and having certain requirements on, e.g., size, weight, and power consumption.

In various embodiments, the estimation module 160 can implement a particular resource constraint 120 as a hard constraint, as a soft constraint, or as a combination of a hard and a soft constraint. In this context, a hard constraint indicates that the model architecture 110 must strictly obey the resource constraint 120 with no possibility of overage. Conversely, a soft constraint can be implemented as a penalty term that negatively impacts a model architecture's performance during evaluation of the objective function by a factor proportional to the difference between the model architecture's resource requirements and the one or more resource constraints. A combination of hard and soft resource constraints can be used in which the resource constraint becomes progressively "harder" depending upon the stage of iteration of, for example, the adaptive refinement module 140. In some embodiments, the hard resource constraint can be imposed with an initial margin that is progressively tightened throughout the adaptive refinement process. In other words, the hard resource constraint can include a margin that changes over time. The change in the margin can be a function of the number of iterations performed.

In some embodiments, estimation of the model architecture's memory requirement can include an assumption that all weights need to be stored in system memory for the duration of the classification process in order to minimize the number of memory operations and thus achieve a higher throughput. In some embodiments, the number of weights for each convolutional layer $|\vec{\theta}_{conv}|$ is a function of the kernel size f, the number of inputs x, and the number of output features k (including the bias). In some embodiments, the number of weights for each fully-connected layer $|\vec{\theta}_{fc}|$ is the product of the number of hidden nodes h and the number of inputs x (including the bias). In some embodiments, estimation of the memory requirement for a particular model architecture can be based on the GEMM (General Matrix-to-Matrix Multiplication) algorithm, which involves summing the number of weights across the network and multiplying the sum by the number of bytes per element ($B_{pe}$). In some embodiments, estimation of the model architecture's memory requirement can include an assumption that an optimized implementation of a forward-pass of the model architecture utilizes at least two memory buffers to store the inputs and outputs during computation. In some embodiments, a ping-pong buffering approach can be considered in which sufficient memory is allocated to store the largest input and output volumes (wherein this memory is reused throughout the network) for all layers l. Including these assumptions, an exemplary estimation of the memory requirement for a model architecture can be represented as:

$$\text{mem} = B_{pe} \cdot (\Sigma |\vec{\theta}_{conv}| + \Sigma |\vec{\theta}_{fc}| + \max_l(|\vec{x}_l|, |\vec{x}_l|)) \qquad (6)$$

The total FLOP/s requirement of the model architecture 110 is also a function of the number of weights. In a convolutional layer, weighted filters are convolved with the input volume. Thus, the total FLOP/s for convolutional layers, which is equivalent to the number of weights times the height and width of the input (after scaling by 1 over the stride s in both directions) can be represented as:

$$\text{flop}_{conv} = \left(\frac{1}{s} \cdot x_w \cdot x_h\right) \cdot (x_d \cdot f_w \cdot f_h + 1) \cdot k \qquad (7)$$

In the fully-connected layers, the estimation of the model architecture's FLOP/s requirement can include calculation of one fused multiply-add (FMA) for every weight. In such an embodiment, the estimation of FLOP/s for a fully-connected layer is then equivalent to the number of weights:

$$\text{flop}_{fc} = h \cdot (x+1) \qquad (8)$$

Finally, the estimated FLOP/s requirement for the entire model architecture can be obtained by summing the FLOP/s requirements for all layers:

$$\text{flop}_{model} = \Sigma_l \text{flop}_{conv}(l) + \Sigma_l \text{flop}_{fc}(l) \qquad (9)$$

Although resource constraints such as memory and FLOP/s have been discussed thus far, one of ordinary skill in the art would appreciate that systems and methods described herein contemplate use of a range of resource constraints 120. For example, other possible resource constraints can include power consumption of a model architecture 110 on a given hardware platform or the speed of execution of a forward pass of the model architecture 110 measured in number of inferences per second (IPS). In some embodiments, these and other resource constraints 120 can be formulated (empirically or otherwise) as a function of intrinsic model architecture properties such as memory and FLOP/s. In some embodiments, higher-level resource constraints on power and IPS can be directly specified (in addition to or instead of FLOP/s or memory constraints) for embedded platforms or for applications that require a minimum number of IPS. Resource constraints 112 can also include number of trained weights and parameter count in some embodiments.

To validate the optimization techniques discussed herein, a number of experiments were conducted using the systems and methods described herein.

In a first experiment, the system 100 randomly generated 50 model architectures. These 50 random model architectures were adaptively refined to produce 50+20 adaptive model architectures wherein the initial 50 adaptive model architectures were only trained on a predefined number of iterations (in this case, 8 iterations) while the last 20 were trained to full convergence. In all experiments, a portion of the available annotated data for training was divided out to form a set of held-out test data while the remainder was divided into sets of training and validation data used during individual model architecture learning runs. In all experiments, $\beta$ was set to 0.00005, learning rate to 0.0005, and batch size for normalization to 128. The coordinate descent scaling factor $\alpha$ (see Algorithm II) was set to either 1.5 or 0.66 depending on the direction.

Initially, the performance of several variants of our proposed algorithm was assessed with no resource constraints in effect (that is, with infinite resources). The CIFAR-10 dataset composed of 60,000 32×32 color images with 10 object classes was used. The dataset contains 50000 training images and 10000 test images. Five-thousand images from the training set were selected for validation. To augment the data, a data augmentation process was performed wherein images were flipped with probability of 0.5, padded, cropped into 32×32 sections, and then color enhanced.

To provide a benchmark for comparison, results are discussed below in relation to the publicly available data model known as Visual Geometry Group (VGG). In line with the construction of VGG, which follows the use of 3×3 convolutions, this experiment was performed using a similar restricted search space. More specifically, the system was allowed up to generate model architectures with up to 26 convolutional layers with up to 128 filters in each layer while limiting the size of convolutional kernels up to 3×3 and maxpools up to 2×2 with a stride of 2. For the fully connected layers, the system was allowed to configure up to 2048 hidden nodes in the model architecture.

Model architectures produced by the system in this experiment were trained on the training data. Validation data was used for evaluating model generalization during architecture optimization. Once a final model architecture has been selected, the final model architecture can be trained using all training data including the validation data to boost performance on independent test data.

The results for these experiments can be seen in Table 1. In Table 1, memory is displayed in megabytes (MB) and FLOP/s is provided in giga-operations per second (GOP/s). The best non-ensemble method (Async 4 workers) achieved an accuracy of 90%, which matched the performance of the VGG-19 model as implemented and trained using our architecture generation framework. The result was 2% lower than the best published results of 92% for VGG-19, although weight inheritance was not employed, a technique that was found to boost results by over 2%. Nonetheless, the system discussed herein was able to match or exceed that performance in the model architecture developed using the asynchronous ensemble variant of the process based on the best 4 performers (final and interim) from among the 120 model architectures produced by a single run of the overall procedure. It should be noted that certain embodiments of the systems and methods described herein produce complementary classifiers they develop the selected model architecture. The other algorithm variants (i.e., synchronous, asynchronous, and N-best) produced model architectures having similar performance with the model architectures averaging accuracy in the high eighty-percent range.

TABLE 1

| Method Variants | Test Set Accuracy | | Resulting Model Resource | | |
|---|---|---|---|---|---|
| | Model: Train | Model: Train + Val | Param Count | Mem (MB) | Flop/s (GOP/s) |
| Synchronous (1 worker) | 88.5% | 89.0% | $3.9 \times 10^6$ | 17.6 | .72 |
| Async (4 workers) | 88.7% | 90.2% | $2.6 \times 10^6$ | 11.9 | .65 |
| Async Ensemble (Best 4) | 91.3% | 92.6% | $1.1 \times 10^7$ | 51.0 | 2.7 |
| N-Best (4 workers) | 88.6% | 88.8% | $2.7 \times 10^6$ | 12.8 | 1.4 |
| VGG-19 | 89.9% | 90.0% | $2.1 \times 10^7$ | 82.7 | .40 |

Subsequently, further experiments were performed wherein the total number of random samples and initial adaptive samples was kept the same but the percent mix of random samples vs. initial adaptive samples was adjusted. The resulting process produced models with different sizes but only minor differences in accuracy (all within about +/−1% in a separate assessment). In some embodiments, the asynchronous variant of the process can provide a good balance among factors as it leverages parallel computing resources effectively. In some embodiments, the method can employ a 50/50 mix for random sampling and initial adaptive sampling stages t provide a good balance between accuracy and model size.

Model architectures produced using systems and methods described herein can achieve levels of accuracy over 95% by changing the production rules to expand the "space of all architectures" reachable by the model representation. For example, higher accuracy may be achieved by allowing model architectures that incorporate branching layers or skip connections.

Systems and methods described herein can dramatically reduce the amount of time and computational resources needed to arrive at selected model architectures in comparison to conventional methods. For example, conventional approaches have trained thousands of architectures for tens of thousands of steps. As demonstrated in the experiment above, similar results may be achieved with the methods described herein by training only 120 model architectures with all but the last 20 of those model architectures being trained for less than 3000 iterations. Further experiments have demonstrated that the present systems and methods involving stochastic coordinate descent are computationally inexpensive relative to conventional methods. For example, competitive model architectures (in terms of accuracy) were produced using four (4) NVidia® Titan-X class GPUs in about 12 hours as opposed to requiring hundreds to thousands of GPUs using conventional methods.

Although some embodiments of the systems and methods described herein use a first-available compute-node allocation strategy for the parallel version of the method, in other embodiments may use other allocation strategies in heterogeneous (mixed CPU/GPU) cluster environments.

Additional experiments were performed to demonstrate the impact of enforcing resource constraints on development of the selected model architecture in accordance with the present methods. The experiments used CIFAR-10 data for training and validation. The experiments used the asynchronous version of the method and rejected randomly generated model architectures which did not meet resource constraints and continued to generate new random model architectures until constraints were met. In the adaptive refinement stage, model architectures continued to be refined until a sufficiently constrained model architecture was created (i.e., a model architecture satisfying the resource constraints). The adaptive refinement module was configured to choose a different coordinate dimension along which to alter the model architecture whenever a model architecture was rejected for failure to satisfy resource constraints. Unlike the experiment described above, validation data were not included in training the final selected model architecture as the experiment was focused on determining relative trends.

The results of the additional experiments showed that the automated method produced model architectures subject to resource constraints that exhibit little loss of accuracy while respecting the resource constraints. Table 2 shows the relationship between network size reduction and accuracy and provides details of selected model architectures given different target resource constraints (for both memory and FLOP/s in our experiments) specified as a percentage of the unconstrained baseline. For instance, the model architecture subject to memory and FLOP/s constraints at a level of 50% of the unconstrained model suffered no less than a 2% loss of accuracy. The model architecture subject to memory and FLOP/s constraints at a level of 10% of the unconstrained model suffered only a 5% loss of accuracy.

TABLE 2

| Target Constraints (%) | Test Set Accuracy Model: Train | Resulting Model Resource | | | | |
|---|---|---|---|---|---|---|
| | | Param Count | Mem (MB) | Flop/s (GOP/s) | % Mem (actual) | % Flop (actual) |
| 100 | 88.7% | $2.6 \times 10^6$ | 11.36 | 0.65 | 100 | 100 |
| 90 | 88.3% | $2.1 \times 10^6$ | 8.52 | 0.2 | 75.0 | 30.8 |
| 70 | 87.4% | $1.5 \times 10^6$ | 7.78 | 0.2 | 68.5 | 30.8 |
| 50 | 87.0% | $8.0 \times 10^5$ | 4.57 | 0.12 | 40.2 | 18.5 |
| 30 | 85.5% | $3.6 \times 10^5$ | 2.37 | 0.04 | 20.9 | 6.2 |
| 10 | 84.4% | $1.4 \times 10^5$ | 1.02 | 0.04 | 9.0 | 6.2 |

In accordance with various embodiments described herein, the method can incorporate the resource constraint only as an upper bound. Accordingly, it is possible that the selected model architecture after constrained optimization will not hit the target constraints exactly.

The experiment described above demonstrates that satisfying memory constraints is non-trivial and that the formulation of memory constraint estimation described herein reflects realistic memory allocation in optimized runtime software as opposed to just model size.

Further experiments were conducted to test the use of soft resource constraints as opposed to hard resource constraints. In these experiments, the resource constraints were allowed to be more relaxed (i.e., a soft constraint was used) during generation of random model architectures (e.g., by allowing the model to exceed resource constraints by up to 2×). The enforcement of the resource constraint became more stringent in a linear fashion throughout adaptive refinement of the model architectures until the target constraint was enforced at the last iteration. In this experiment, the use of soft resource constraints did not have a large impact on accuracy of the selected model architecture over the accuracy of model architectures optimized using hard constraints. However, the soft constraint approach may be beneficial in certain circumstances especially for more stringent resource constraints 120.

Table 3 illustrates the runtime performance of an unconstrained model architecture and a hard-constrained selected model architecture in accordance with embodiments described herein along with the VGG-19 model. The unconstrained model learned from CIFAR-10 training data (labeled CF100) is 1.9× more efficient on Tegra® TX1 compared to VGG-19 with similar or better accuracy. The selected model architecture, which was subject to target resource constraints of 50% (labeled CF50), is 2.5× more efficient than VGG-19 using the same processor with only about a 2% reduction in accuracy. For reference, the best unconstrained model architecture (developed using the asynchronous ensemble variant of the method) included $1.1 \times 10^7$ parameters and achieved an accuracy of 92.6%.

TABLE 3

| | Test Set Accuracy | Resulting Model Resource | | | Performance (Infer/sec) | |
|---|---|---|---|---|---|---|
| Target Model | Model: Train + Val | Param Count | Mem (MB) | Flop/s (GOP/s) | Titan Xp | Tegra® TX1 |
| CF100 | 90.2% | $2.6 \times 10^6$ | 11.36 | 0.65 | 1246 | 354 |
| CF50 | 87.8% | $0.8 \times 10^6$ | 4.57 | 0.12 | 1745 | 452 |
| VGG-19 | 90.0% | $21 \times 10^6$ | 78.91 | 0.4 | 328 | 183 |

It is also worth noting that as compared to VGG-19, the unconstrained model architecture CF100 measured higher in IPS despite being more demanding based on FLOP/s. This is due to the sizeable difference in the number of memory operations between the two networks (see Table 3). Typically, GPU memory operations (Global Memory access in particular) are more expensive than ALU (arithmetic logic unit) operations. In addition, memory operations consume much more power than ALU operations. Thus, it is advantageous in some embodiments to focus resource constraints on increasing IPS and reducing power consumption.

Figure 6:
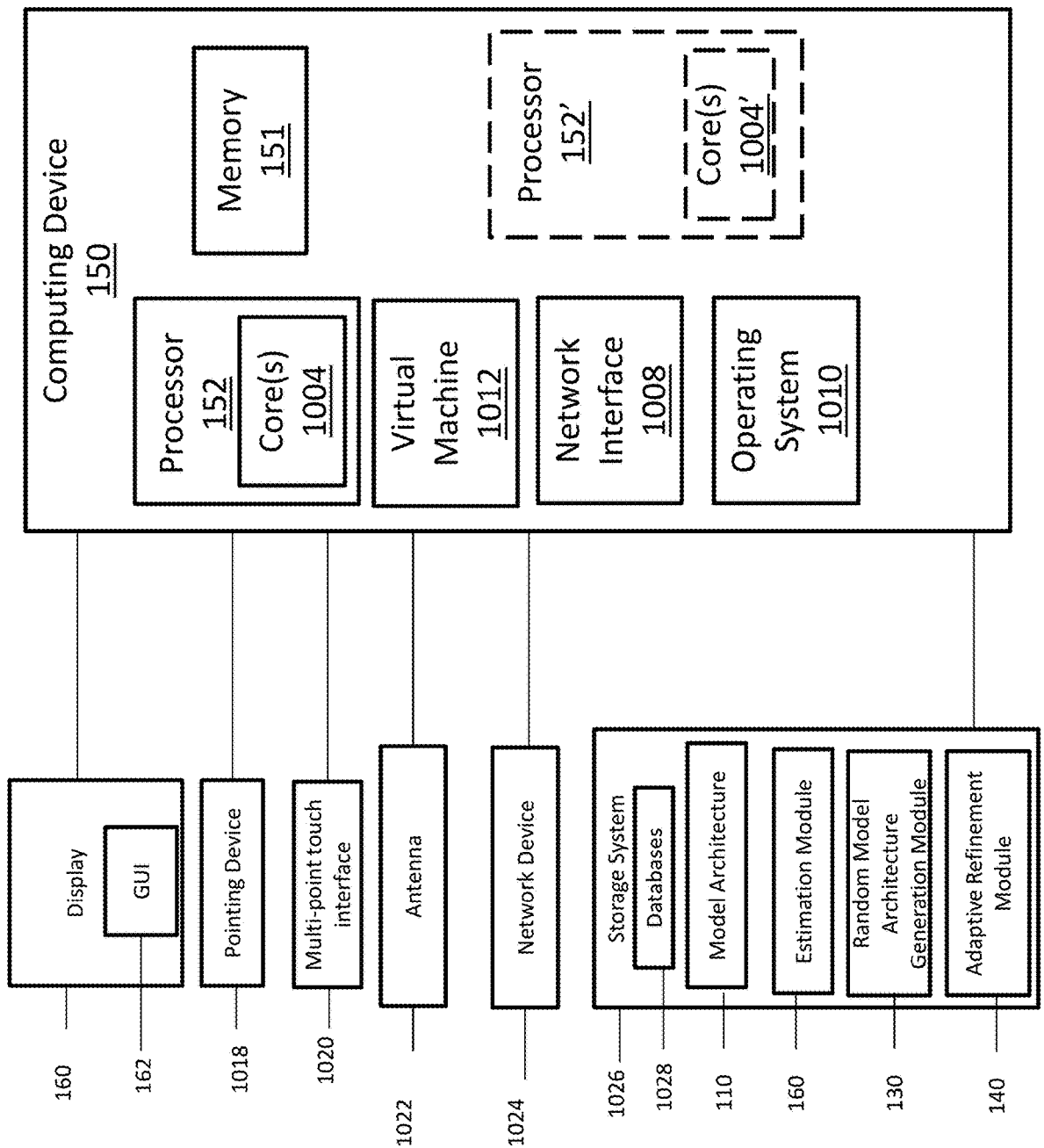
FIG. 6 illustrates a method for optimization of a model architecture in accordance with various embodiments described herein.

FIG. 6 illustrates an exemplary computing device 150 that may be utilized in an exemplary embodiment to perform the methods taught herein. The computing device 150 includes one or more non-transitory computer-readable media for storing one or more computer-executable instructions, such as but not limited to software or firmware modules of system 100 according to the principles taught herein. It will be appreciated that the modules may be implemented as a greater or lesser number of modules than described herein and that the functionality of the modules may be combined or partitioned other than as illustrated herein without departing from the scope of the present invention. The non-transitory computer-readable media can include, but are not limited to, one or more types of hardware memory, non-transitory tangible media (for example, one or more magnetic storage disks, one or more optical disks, one or more USB flash drives), and the like.

For example, memory 151 included in the computing device 150 can store computer-readable and computer-executable instructions or software for implementing exemplary embodiments such as methods and modules described above in reference to FIGS. 1-5. For example, the memory 151 can store one or more of the estimation module 160, the random model architecture generation module 130, the adaptive refinement module 140, estimation module 160 and one or more model architectures 110. Memory 151 can be non-transitory computer-readable media including a computer system memory or random access memory, such as DRAM, SRAM, EDO RAM, and the like. Memory 151 can include other types of memory as well, or combinations thereof.

Exemplary computing device 150 also includes processor 152 and associated core 1004, and optionally, one or more additional processor(s) 152' and associated core(s) 1004' (for example, in the case of computer systems having multiple processors/cores), for executing computer-readable and computer-executable instructions, modules, or software stored in the memory 151. Processor 152 and processor(s) 152' can each be a single core processor or multiple core (1004 and 1004') processor. The processors 152, 152' can be classified as central processing units (CPUs) or graphics processing units (GPUs).

In some embodiments, the processor 152 can satisfy a range of SWaP constraints. For example, low-SWaP options can include ASIC, FPGA, GPU, and DSP processors. Modern CUDA-enabled GPUs, such us the Tegra® K1 (TK1), consist of devices with one or more streaming multiprocessors (SMs) each containing multiple cores. GPUs work well for parallel applications with high-levels of fine-grain data parallelism. Computer Vision is an application in which there is little dependency between data elements or image pixels. This is often referred to as embarrassing parallelism, meaning that the task is easily broken into a number of smaller, independent, parallel sub-tasks. In some embodiments, the processor 152 can exploit thread-level parallelism (TLP) on multi-core CPUs or data-level parallelism (DLP) on the GPU. In some embodiments, DLP can be employed on CPUs by utilizing single instruction multiple data (SIMD) units. In another embodiment, a combination of GPUs and multi-core CPUs is used. In some embodiments, the processor 152 can include a hardware-accelerated video decoder. In some embodiments, the processor 152 can include a hardware-implemented deep neural network. In such an embodiment, the model architecture 110 can be formed at least partially from the hardware-implemented deep neural network.

Virtualization can be employed in the computing device 150 so that infrastructure and resources in the computing device can be shared dynamically. A virtual machine 1012 can be provided to handle a process running on multiple processors so that the process appears to be using only one computing resource rather than multiple computing resources. Multiple virtual machines can also be used with one processor.

A user can interact with the computing device 150 through a display 160, such as a touch screen display or computer monitor, which can display one or more user interfaces or graphical user interfaces (GUIs) 162 that can be provided in accordance with exemplary embodiments. The computing device 150 can also include other I/O devices for receiving input from a user, for example, a keyboard or any suitable multi-point touch interface 1020 or a pointing device 1018 (e.g., a pen, stylus, mouse, or trackpad). The multi-point touch interface 1020 and the pointing device 1018 can be coupled to the display 160. The computing device 150 can include other suitable conventional I/O peripherals.

The computing device 150 can also include one or more storage systems 1026 or devices, such as a hard-drive, CD-ROM, or other non-transitory computer readable media, for storing data and computer-readable instructions and/or software, such as one or more model architectures 110 and code for the execution thereof and/or data related thereto; modules such as the estimation module 160, the random model architecture generation module 130, the adaptive refinement module 140; or annotated sample data for use in training of model architectures 110; or portions thereof. Exemplary storage system 1026 can also store one or more databases 1028 for storing any suitable information required to implement exemplary embodiments. The databases can be updated by a user or automatically at any suitable time to add, delete, or update one or more items in the databases. In some embodiments, some or all of the modules and model architectures 110 shown in the memory 151 in FIG. 1 may be stored in databases 1028 of the storage system 1026.

The computing device 150 can include a network interface 1008 configured to interface via one or more network devices 1024 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1008 can include a built-in network adapter, network interface card, PCMCIA network card, card bus network adapter, wireless network adapter, USB network adapter, modem or any other device suitable for interfacing the computing device 150 to any type of network capable of communication and performing the operations taught herein. In some embodiments, the computing device 150 can communicate wirelessly with other computing systems or networking environments using an antenna 1022. Moreover, the computing device 150 can be any computing device that is capable of communication and that has sufficient processor power and memory capacity to perform the operations taught herein.

The computing device 150 can run operating system 1010, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or other operating systems capable of running on the computing device and performing the operations taught herein. In exemplary embodiments, the operating system 1010 can be run in native mode or emulated mode. In an exemplary embodiment, the operating system 1010 can be run on one or more cloud machine instances.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Figure 7:
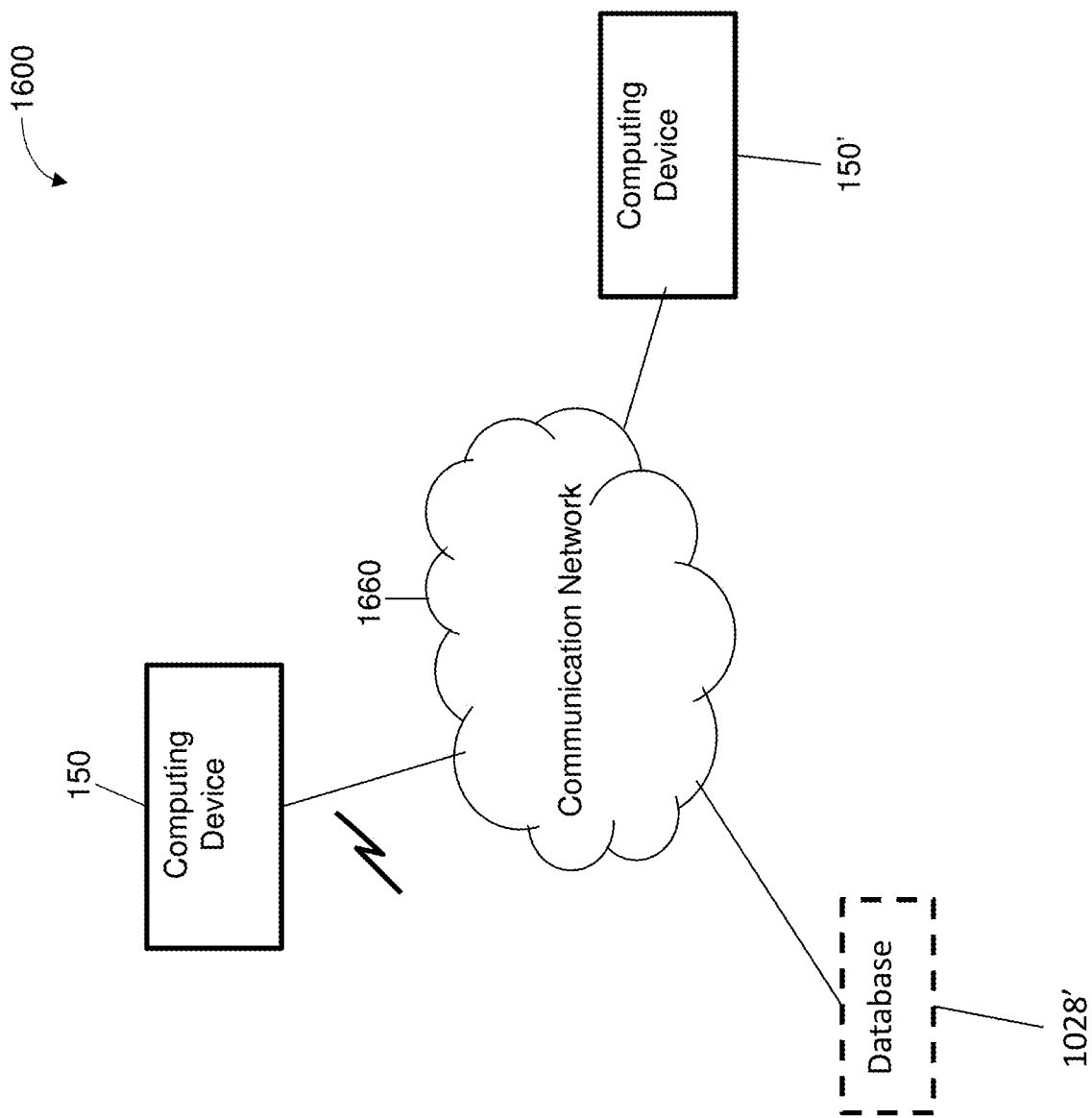
FIG. 7 illustrates an exemplary computing device suitable for use with systems described herein.

FIG. 7 illustrates a block diagram of an exemplary distributed network environment 1600 for use with systems and methods taught herein. The environment 1600 can include one or more computing devices 150, 150' configured to be in communication via a communication network 1660, which can be any network over which information can be transmitted between devices communicatively coupled to the network. For example, the communication network 1660 can be the Internet, Intranet, virtual private network (VPN), wide area network (WAN), local area network (LAN), and the like. In some embodiments, the communication network 1660 can be part of a cloud environment. For example, the environment 1600 can include multiple computing devices 150, 150' that can operate as interconnected workers as described above with respect to FIGS. 4 and 5. In some environments, the computing device 150 can develop the selected model architecture 110 for live implementation in data analysis on computing device 150'. The environment 1600 can optionally include at least one repository or database 1028', which can be in communication with the computing devices 150, 150' via the communication network 1660.

Those skilled in the art will recognize that the database(s) 1028' can be incorporated into the computing device 150, 150' such that the computing device 150, 150' can include one or more of the databases 1028'. In some embodiments, the databases 1028' can include one or more data architectures 110; the estimation module 160, the random model architecture generation module 130, the adaptive refinement module 140; labeled or annotated data for use in training model architectures 110; or live data for analysis using a selected model architecture. In some embodiments, the databases 1028' can include various data models or databases described above including neurons or filters, feature extraction layers 156, or classification layers 158, or computer-executable instructions or automated scripts for model architecture optimization subject to resource constraints.

Figure 8:
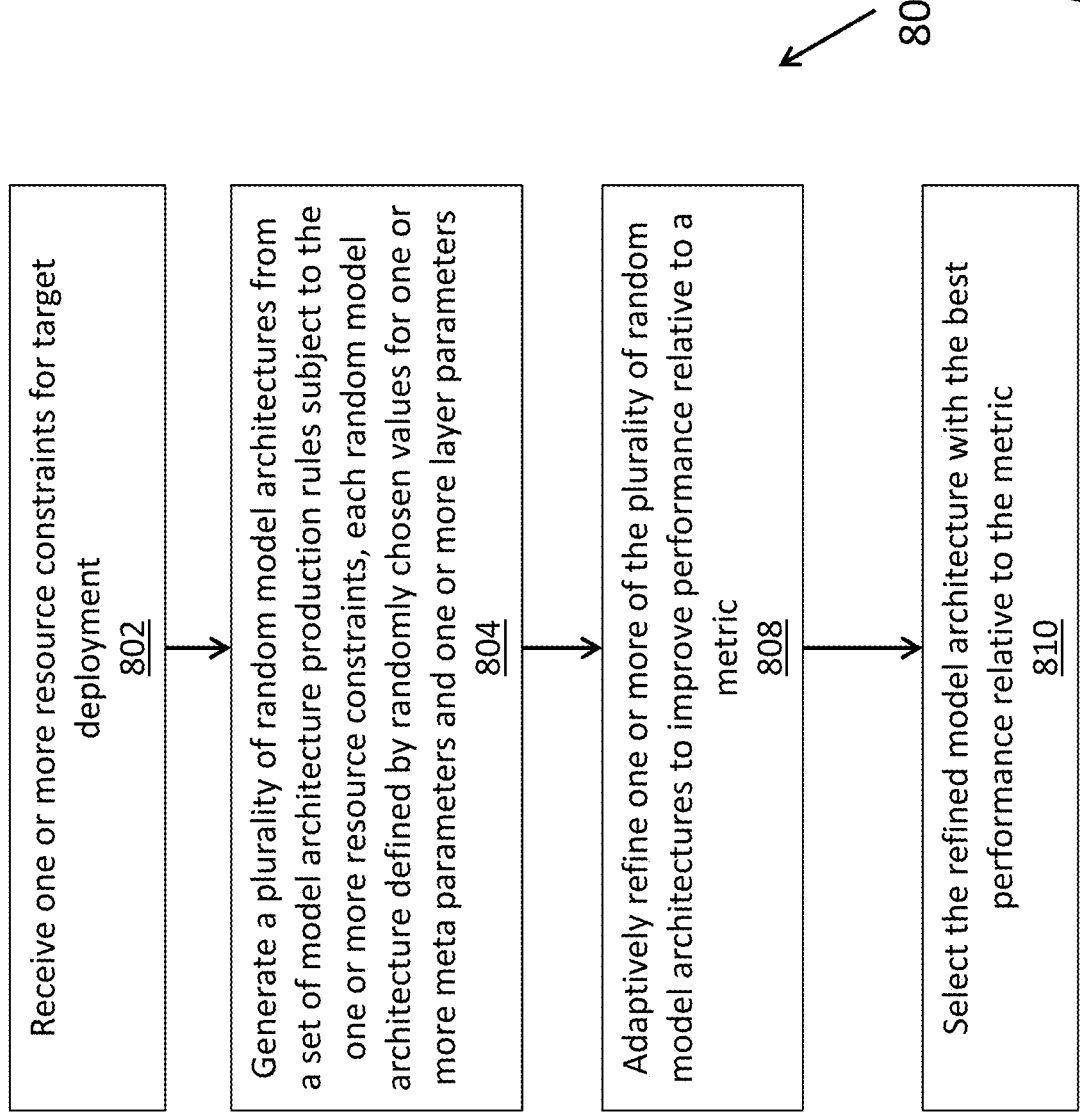
FIG. 8 illustrates an exemplary network environment suitable for use with systems described herein.

FIG. 8 illustrates a flowchart for a method 800 of selecting an optimized data model architecture in accordance with various embodiments described herein. The sequence begins by the system 100 receiving one or more resource constraints 120 for target deployment (step 802) and generating random model architectures 110a-110n from a set of model architecture production rules subject to the one or more resource constraints 120 (step 804). The resource constraints 120 can be retrieved from a memory 151 or supplied by a user. Each of the random model architectures 110a-110n is defined by randomly chosen values for one or more meta parameters 112 and one or more layer parameters 114. For example, the random model architectures 110a-110n can be generated using a random model architecture generation module 130 and evaluated as to whether the model architecture 110a-110n satisfied resource constraints 120 using an estimation module 160 as described above. The method 800 also adaptively refines one or more of the random model architectures 110a-110n to improve performance relative to a metric (step 806). For example, an adaptive refinement module 140 can be used to refine the model architecture 110a-110n to improve performance of the model architecture relative to a metric as evaluated by the objective function assessed using the estimation module 160. The refined model architecture with the best performance relative to the metric are then selected (step 808).

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes system elements, device components or method steps, those elements, components or steps may be replaced with a single element, component, or step. Likewise, a single element, component, or step may be replaced with multiple elements, components, or steps that serve the same purpose. Moreover, while exemplary embodiments have been shown and described with references to particular embodiments thereof, those of ordinary skill in the art understand that various substitutions and alterations in form and detail may be made therein without departing from the scope of the present disclosure. Further still, other aspects, functions, and advantages are also within the scope of the present disclosure.

Exemplary flowcharts are provided herein for illustrative purposes and are non-limiting examples of methods. One of ordinary skill in the art recognizes that exemplary methods may include more or fewer steps than those illustrated in the exemplary flowcharts, and that the steps in the exemplary flowcharts may be performed in a different order than the order shown in the illustrative flowcharts.

The invention claimed is:

1. A method of selecting an optimized data model architecture executed by a computing device equipped with a processor and a memory operatively coupled to the processor, the method comprising:
  receiving, with the computing device, one or more hardware resource constraints for a target deployment platform;
  generating, via the computing device, a plurality of random model architectures from a set of model architecture production rules subject to the one or more hardware resource constraints, each random model architecture defined by randomly chosen values for one or more meta parameters and one or more layer parameters;
  adaptively refining, via the computing device, one or more of the plurality of random model architectures to improve performance relative to a metric by backpropagation of the random model architecture to at least partial convergence; and
  selecting, via the computing device, the refined model architecture with the best performance relative to the metric.

2. The method of claim 1, wherein generating the plurality of random model architectures subject to the one more hardware resource constraints comprises:
  determining, via the computing device, for each random model architecture generated, whether the random model architecture satisfies the one or more hardware resource constraints; and
  discarding, via the computing device, any of the generated random model architectures that fail to satisfy the one or more hardware resource constraints prior to the adaptive refining of the one or more of the plurality of random model architectures.

3. The method of claim 1, wherein adaptively refining the random model architectures is performed subject to the one or more hardware resource constraints.

4. The method of claim 1, wherein the one or more hardware resource constraints include parameter count, runtime memory or number of floating point operations per second.

5. The method of claim 1, wherein adaptively refining the random model architectures includes iteratively adjusting one of the one or more layer parameters.

6. The method of claim 1, wherein adaptively refining the random model architectures includes iteratively adjusting one of the one or more meta parameters.

7. The method of claim 1, further comprising:
selecting, via the computing device, one or more of the plurality of random model architectures for adaptive refinement according to performance relative to the metric.

8. The method of claim 7, further comprising:
determining, via the computing device, performance relative to the metric including back-propagating the plurality of random model architectures only to partial convergence.

9. The method of claim 1, wherein adaptively refining one or more of the plurality of random model architectures includes refining at least two of the plurality of random model architectures in parallel and selecting the random model architecture with the best performance relative to the metric for further refinement.

10. The method of claim 1, wherein the one or more meta parameters include a number of layers or an ordering of layers.

11. The method of claim 1, wherein the one or more layer parameters include a convolutional filter size, a number of filters, a stride length, or a padding length.

12. The method of claim 1, wherein each of the plurality of model architectures includes a convolutional neural network.

13. The method of claim 1, wherein each of the plurality of random model architectures includes at least one composite layer.

14. A non-transitory medium holding computer-executable instructions for selecting an optimized data model architecture, the instructions when executed causing at least one computing device to:
receive one or more hardware resource constraints for a target deployment platform;
generate a plurality of random model architectures from a set of model architecture production rules subject to the one or more hardware resource constraints, each random model architecture defined by randomly chosen values for one or more meta parameters and one or more layer parameters;
adaptively refine one or more of the plurality of random model architectures to improve performance relative to a metric by back-propagation of the random model architecture to at least partial convergence; and
select the refined model architecture with the best performance relative to the metric.

15. The medium of claim 14, wherein generating the plurality of random model architectures subject to the one more hardware resource constraints comprises:
determining, via the computing device, for each random model architecture generated, whether the random model architecture satisfies the one or more hardware resource constraints; and
discarding, via the computing device, any of the generated random model architectures that fail to satisfy the one or more hardware resource constraints prior to the adaptive refining of the one or more of the plurality of random model architectures.

16. The medium of claim 14, wherein adaptively refining the random model architectures is performed subject to the one or more hardware resource constraints.

17. The medium of claim 14, wherein the one or more hardware resource constraints include parameter count, runtime memory or number of floating point operations per second.

18. The medium of claim 14, wherein adaptively refining the random model architectures includes iteratively adjusting one of the one or more layer parameters.

19. The medium of claim 14, wherein adaptively refining the random model architectures includes iteratively adjusting one of the one or more meta parameters.

20. The medium of claim 14, wherein the instructions when executed further cause the at least one computing device to:
select one or more of the plurality of random model architectures for adaptive refinement according to performance relative to the metric.

21. The medium of claim 20, wherein the instructions when executed further cause the at least one computing device to:
determine performance relative to the metric including back-propagating the plurality of random model architectures only to partial convergence.

22. The medium of claim 14, wherein adaptively refining one or more of the plurality of random model architectures includes refining at least two of the plurality of random model architectures in parallel and selecting the random model architecture with the best performance relative to the metric for further refinement.

23. The medium of claim 14, wherein the one or more meta parameters include a number of layers or an ordering of layers.

24. The medium of claim 14, wherein the one or more layer parameters include a convolutional filter size, a number of filters, a stride length, or a padding length.

25. The medium of claim 14, wherein each of the plurality of model architectures includes a convolutional neural network.

26. The medium of claim 14, wherein each of the plurality of random model architectures includes at least one composite layer.

27. A system for selecting an optimized data model architecture, the system comprising:
a computing device including a processor and a memory operatively coupled to the processor, the memory having instructions stored therein that when executed by the processor cause the computing device to:
receive one or more hardware resource constraints for a target deployment platform;
generate a plurality of random model architectures using a random model architecture generation module from a set of model architecture production rules subject to the one or more hardware resource constraints, each random model architecture defined by randomly chosen values for one or more meta parameters and one or more layer parameters;
adaptively refine one or more of the plurality of random model architectures using an adaptive refinement module to improve performance relative to a metric by back-propagation of the random model architecture to at least partial convergence; and
select the refined model architecture with the best performance relative to the metric.

28. The system of claim 27, further comprising:
one or more databases holding at least one of stored hardware resource constraints, model architecture production rules or partially trained model architectures.

* * * * *